Figure 1:
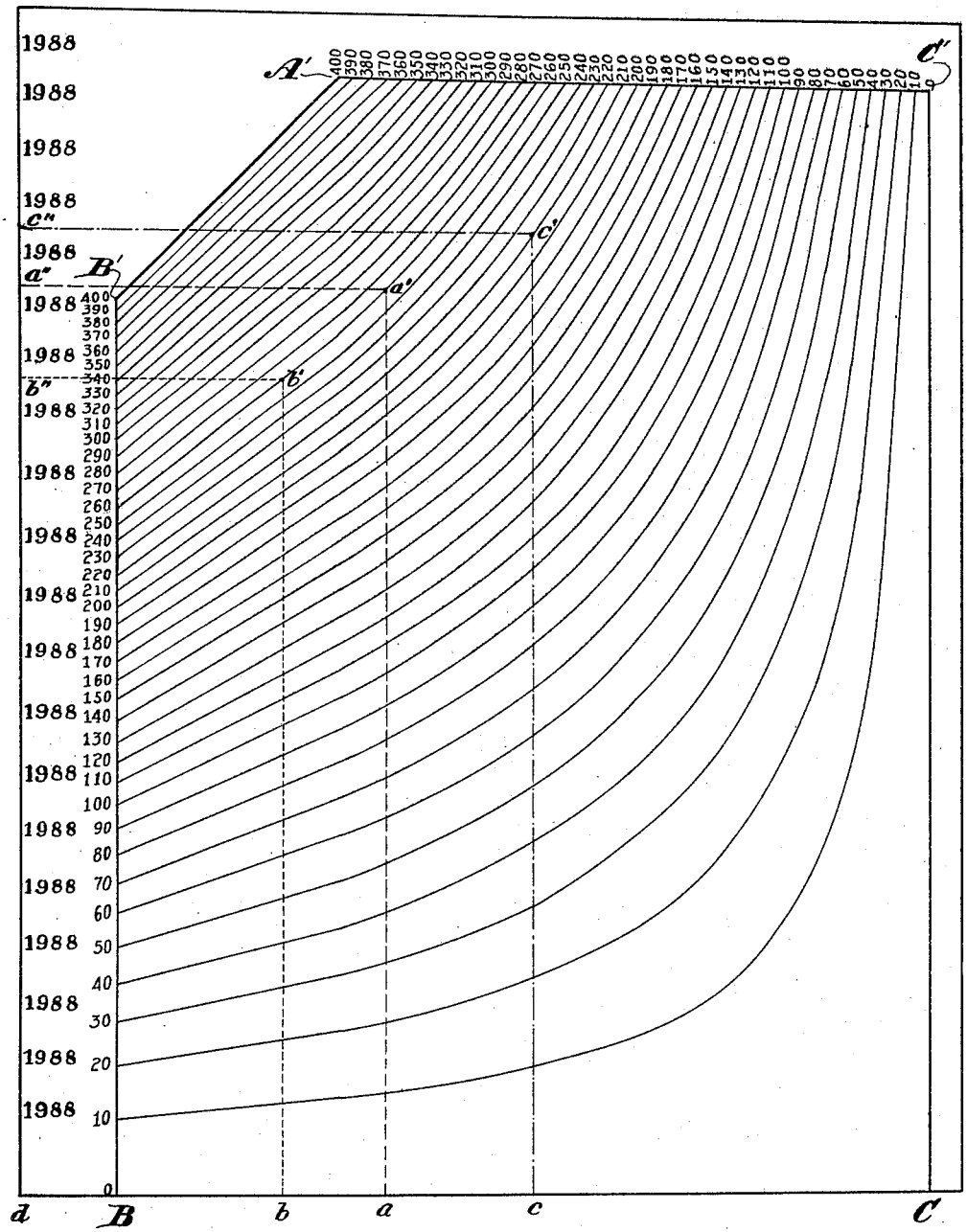

C. E. DEVERS.
MEASURING CHART.
APPLICATION FILED SEPT. 4, 1917.

1,357,386.

Patented Nov. 2, 1920.
3 SHEETS—SHEET 1.

WITNESS:
Eugene L. Snyder.

INVENTOR
Clyde E. Devers
BY Harry Frease
ATTORNEY

UNITED STATES PATENT OFFICE.

CLYDE E. DEVERS, OF ALLIANCE, OHIO, ASSIGNOR TO THE McCASKEY REGISTER COMPANY, OF ALLIANCE, OHIO, A CORPORATION OF OHIO.

MEASURING-CHART.

1,357,386.   Specification of Letters Patent.   Patented Nov. 2, 1920.

Application filed September 4, 1917. Serial No. 189,620.

*To all whom it may concern:*

Be it known that I, CLYDE E. DEVERS, a citizen of the United States, residing at Alliance, in the county of Stark and State of Ohio, have invented a new and useful Measuring-Chart, of which the following is a specification.

The invention relates to means for measuring the weight of paper remaining in a roll after a portion of the paper has been unwound therefrom; and the object of the improvement is to provide a chart of convenient size, which may be applied to the end of a roll of paper of known weight, and then cut or torn along a certain line to give a scale for indicating the weight of paper remaining in the roll at any time after a portion thereof has been removed.

Certain kinds of paper for printing are delivered by the manufacturer in the form of a roll wound on a core, by means of which core the roll may be pivotally mounted on or adjacent to a printing press which unwinds paper from the roll in the process of printing; and it is desirable, if not necessary, for the purpose of calculating the cost of any particular piece or job of printing, to know how many pounds of paper have been used therein, and the most convenient method of measuring the amount of paper removed from a roll, is by means of a scale applied radially to the end of the roll.

Although the weight of a part of the paper removed from the roll is related to the end area of the same, it is obvious that a scale having regular or equal gradations cannot be employed in this connection, in view of the fact that the areas of concentric circles do not vary directly as the diameter or radius thereof, but vary as the squares of the respective radii; and if a single scale were made for indicating the different radial dimensions corresponding to equal increments of area, it would only apply to particular rolls of paper having the same weight in proportion to the given end area, and would not apply, as a measure of weight, to rolls of paper having a greater or less density, or a greater or less length.

However, the weight of the paper in a roll is directly related to the area of the end thereof, even though the weight of different rolls may vary because of differences in density, or in the length of the rolls, and even though the density may vary because of differences in the specific gravity of the paper itself or in the closeness or tightness of its winding.

Proceeding from this fact or principle, the object of the present invention is attained by providing a chart having inscribed from one side to another thereof, a series of lines indicating by their intersection with a longitudinal line or division, present or imaginary, the weight of a roll at different radial distances from the periphery of the core, the total length of such longitudinal line representing the known weight and net radius of a given original roll.

A preferred embodiment of the invention, as applied and used in a printing establishment engaged in the manufacture of manifolding bill pads and sales books and other like small books or forms, is illustrated in the accompanying drawings forming part hereof, in which—

Figure 2:
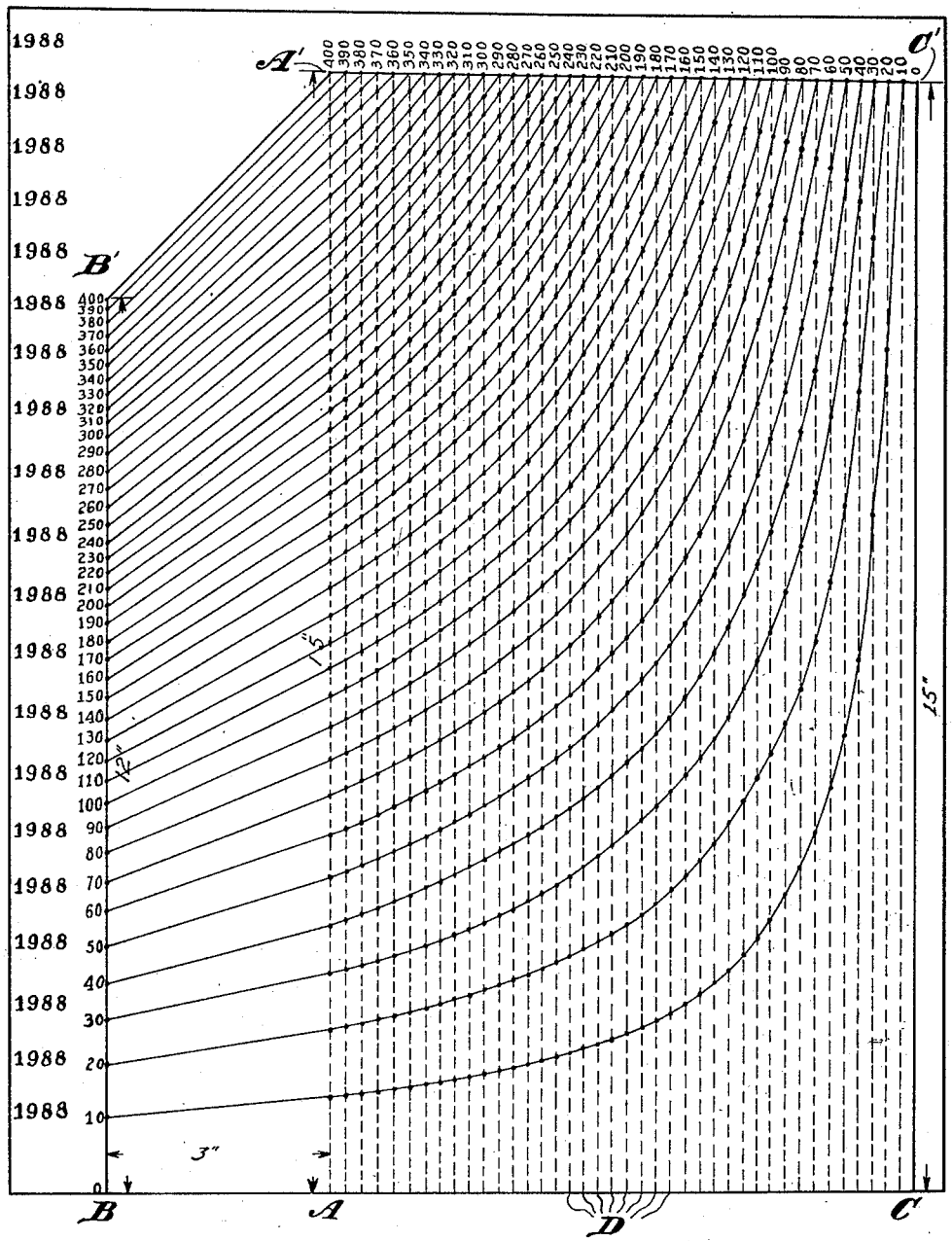
Figure 3:
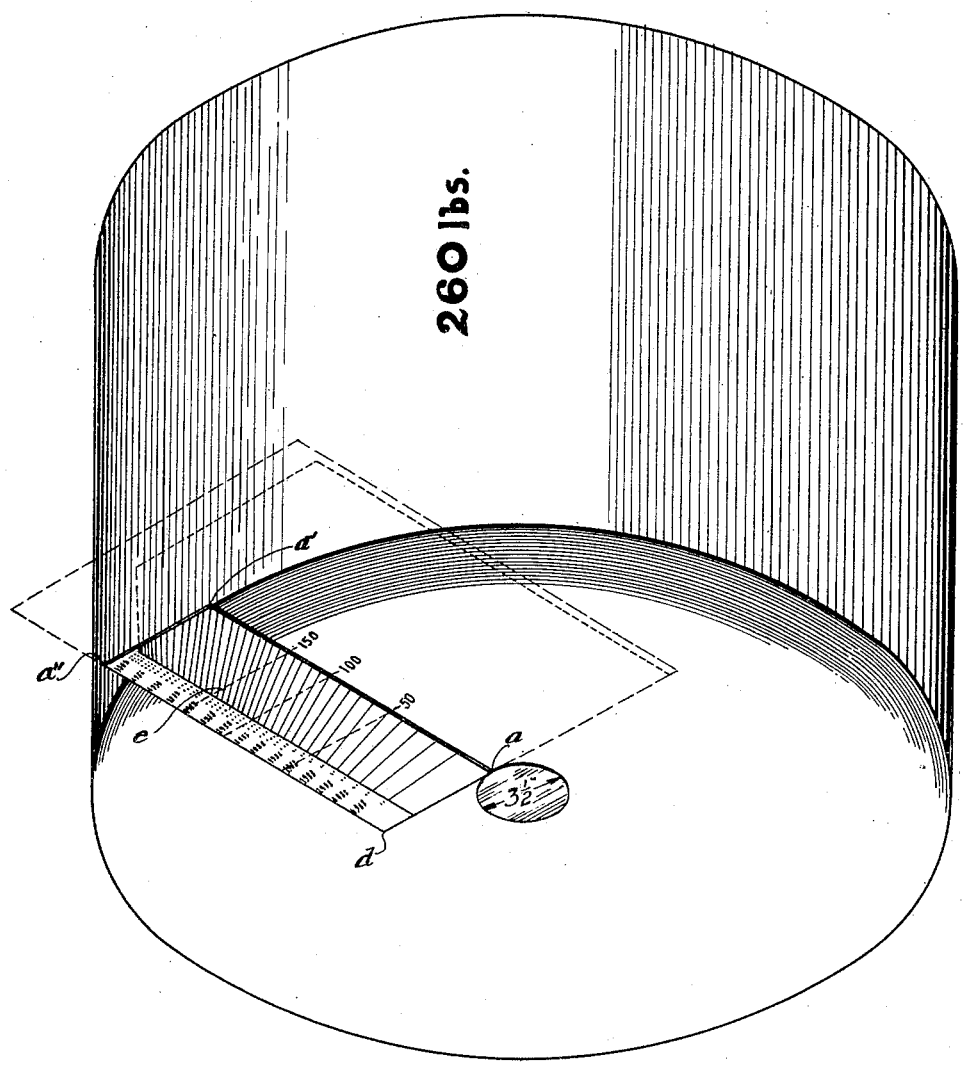

Figure 1 is a plan view of a chart embodying the invention;

Fig. 2, a similar view illustrating the method of making or developing the chart; and Fig. 3, a perspective view of a roll of paper illustrating the use of the chart.

Similar numerals refer to similar parts throughout the drawings.

In the particular art of printing bill pads and sales books, the size of the rolls of paper obtained from the manufacturer seldom, if ever, exceed in size, a diameter of thirty-three and one-half ($33\frac{1}{2}$) inches or a length of twenty-four (24) inches; and the weight of a roll of the maximum dimensions, seldom, if ever, exceeds four hundred (400) pounds, and as the cores of such rolls are uniformly three and one-half ($3\frac{1}{2}$) inches in diameter, there remains a net maximum diameter of thirty (30) inches or a maximum net radius of fifteen (15) inches as the longest measurement to make for which a chart need be provided.

And again, for the same kind of printing, the minimum diameter of a new roll of paper is seldom, if ever, less than twenty-seven and one-half ($27\frac{1}{2}$) inches, or deducting the core, a net diameter of twenty-four (24) inches or a net radius of twelve (12) inches of paper, and the maximum weight of such a roll seldom, if ever, exceeds four hundred (400) pounds, thus again limiting the requirements of a chart for such particular use.

The chart illustrated in Fig. 1 of the accompanying drawings is imprinted on a sheet of paper and, as shown in Fig. 2 is originally drawn or developed from a primary base line A—A', having a length of fifteen (15) inches from the lower or bottom edge B—C of the sheet to the transverse line A'—C' drawn or imprinted adjacent to the upper or top edge of the sheet upon which the chart is finally imprinted; to the left of which primary base line straight lines are employed and to the right of said base line curved lines are employed, but in both cases the principle of the development is substantially the same.

At an arbitrary but substantial distance to the left of the primary base line A—A', is drawn or imprinted a secondary base line B—B', extending upward a distance of twelve (12) inches from the bottom or lower edge B—C of the sheet upon which the chart is printed, the length of which line corresponds to the minimum net radius of the paper in the rolls for which the particular chart is designed, and as shown, this secondary base line is conveniently located about three (3) inches to the left of the base line A—A', corresponding to the difference in the length of these base lines, so that the line B'—A' which is drawn to connect the upper ends thereof, is inclined at an angle of about 45°.

The portion of the chart to the left of the primary base line A—A' is designed for use in measuring the weight of paper in rolls, having net radii (after deducting the core) of from twelve (12) inches, represented in the chart by line B—B' which becomes the left side or ordinate of the chart proper, to fifteen (15) inches, represented in the construction of the chart by the base line A—A', which base line may, if desired, be omitted after the chart is developed; and the diagonal line B'—A' which becomes the upper left side of the chart proper, represents the varying distances from the lower edge of the chart corresponding to the different net diameters of rolls of paper weighing four hundred (400) pounds and having net radii of from twelve (12) to fifteen (15) inches, being the range of such net radii in the rolls of the particular kind of paper ordinarily used in printing bill pads and sales books.

The line B'—A' may thus be referred to as the four hundred (400) pound line and is designated as such in the chart, and between this line and the zero cross line represented by the lower edge of the chart are then drawn cross lines representing the varying weight of paper at different net radial distances in rolls originally weighing four hundred (400) pounds within the range of net radii of from twelve (12) inches to fifteen (15) inches, as follows:—

Given the net radius of twelve (12) inches for a roll weighing four hundred (400) pounds, the radial portion of such total length of twelve (12) inches for each equal increment of weight from the core to the periphery of the original roll is determined by direct calculation or otherwise, and as shown in the drawings, these different radial portions are computed and shown for increments of ten (10) pounds each from zero to four hundred (400) pounds, although it is evident that calculations may be made and increments shown of greater or less number of pounds, as may be desired.

After making such computations, the relative distances from the zero cross line at the lower edge of the chart along the subsidiary base line B—B' for each ten pound increment of weight, are indicated and designated, as for instance 10, 20, 30, 40, 50, etc., and it will be noted that the portions of the total length of the line required for increments of ten pounds are considerably longer at the lower end of the line than at the upper end thereof, which is because the lower end of the line represents those increments or zones of paper located nearer to the center of the roll.

Similar computations are then made to determine the radial portions corresponding to ten (10) pound increments in a roll of paper weighing four hundred (400) pounds and having a net radius (after deducting the core) of fifteen (15) inches, and such radial portions are marked along the primary base line A—A', after which these marks are connected by straight lines with the corresponding marks designated 10, 20, 30, 40, 50, etc., on line B—B' thus completing the left hand portion of the chart.

The differential distances, measured vertically or parallel with the base lines and longitudinally of the chart, between the cross lines thus drawn, represent the ratios of the varying radial distances required for the several ten (10) pound increments of weight, as shown in the chart, from zero (0) to four hundred (400) pounds, which ratios have been determined by the calculations based on a four hundred (400) pound roll having a net radius twelve (12) inches and a four hundred (400) pound roll having a net radius of fifteen (15) inches; and as these ratios are practically, if not absolutely, constant for the varying radial distances required for the several ten (10) pound increments of weight in four hundred (400) pound rolls having net radii ranging from twelve (12) to fifteen (15) inches, it is obvious that a vertical line drawn or cut through the cross lines thus spaced, will give a scale for measuring ten (10) pound increments of weight contained in any four hundred (400) pound roll having a net radius equal to the total length of such intermediate line from the lower edge of the chart to its intersection with the four hundred (400) line B'—A'.

The same method of making or developing the chart could be carried on to the right of the base line, by merely continuing the straight cross lines indefinitely, but the varying weights of new or original rolls range so far below four hundred (400) pounds, that it would require such an extension of straight cross lines as would make a chart of unwieldly dimensions; to avoid which difficulty that portion of the chart to the right of the base line A—A' is arbitrarily shortened and the cross lines given a corresponding curvature, in the following manner:

The tertiary base line A'—C' is drawn horizontally or at right angles to the right from the upper end of the base line A—A', which tertiary base line is thus located fifteen (15) inches above the lower edge of the chart, which is preferably extended above this line to form a suitable margin.

The tertiary base line is arbitrarily divided and marked into a series of equal subdivisions, which, in the full sized original of the chart illustrated in the drawings, are each two (2) tenths of an inch in length and are designated from left to right respectively, 400, 390, 380, 370, 360, 350, and so on down to zero, to represent the varying weights of rolls of paper having a net radius of fifteen (15) inches; and a series of vertical lines D parallel with the primary base line A—A', is then drawn from the lower edge of the chart to the marks thus made and indicated in the tertiary base line A'—C', each of which lines D being fifteen (15) inches long in the full sized chart illustrated on a reduced scale in the drawings, and each one of said lines representing the net radius of a roll of paper having the weight in points indicated at the upper end of the line.

Computations are then made, similar to the computations made with respect to the primary and secondary base lines, to determine the radial portions for each line corresponding to ten (10) pound increments in a roll of paper having a net radius (after deducting the core) of fifteen (15) inches, and weighing the number of pounds indicated at the top of such line; and such radial portions are then marked along the several lines, after which the several marks representing the respective increments are connected by curved lines with each other and with the ends of the corresponding straight lines designated 10, 20, 30, 40, 50 etc., extending from the secondary to the primary base line, thus completing the right hand portion of the chart.

It is obvious that each one of the parallel lines constitutes a scale for measuring the weight of paper contained in any net radial portion of the particular weight of roll used as the basis of the computations for such line, but for simplicity, the present invention does not contemplate the use of actual vertical lines upon the face of the chart. It is evident, however, that when the chart is cut or torn in the manner hereafter described, the longitudinal severed edge of the paper is in fact along some one of such vertical lines, even though the line does not actually appear on the face of the chart.

The completed chart made or developed as shown in Fig. 2, is then reproduced upon sheets of paper or other like material, being imprinted thereon with suitable margins to the left, at the top and on the right of the chart proper, but with the lower edge of the chart coinciding with the lower edge of the sheet so that measurements can be made therefrom.

In reproducing the chart, as shown in Fig. 1, the primary base line A—A' and the parallel lines D may be omitted, and a serial number is imprinted at a plurality of places in and along the margin at the left of the chart for identifying the particular chart and detached portions thereof.

It is the practice of paper manufacturers to stamp upon each roll of paper the net weight of the paper contained therein, and in the use of the chart, when the printer takes a particular roll from stock, he applies one of the charts to the end of the roll with the lower edge B—C thereof at the periphery of the core, and with the vertical length of the chart extending radially to and beyond the periphery of the roll, as shown in Fig. 3.

The printer then notes by marking, or by creasing by bending over the edge of the roll, or otherwise, the intersection of the periphery of the roll with the particular line of the chart representing the known number of pounds in the roll as indicated by the manufacturer's stamp thereon, which, in the instance illustrated in Fig. 3, is 260 pounds, which intersection is indicated on the chart at a' in Figs. 1 and 3 of the drawings; it being understood that the measure by which the intersection of the periphery of the roll with the line representing the known weight of the roll must be measured along a longitudinal line as a—a' parallel with the side of the chart, that is to say with the secondary base line thereof.

In practice, however, it has been found more convenient to apply the left edge of the chart to a radial line of the roll, with the lower left corner d of the chart at the periphery of the core, thus measuring directly along the edge of the sheet to the periphery of the roll at a'' as shown in Figs. 1 and 3, and after marking point a'' at the edge of the sheet, a square is laid upon the chart with its upper horizontal edge at $a''$ and its right hand vertical edge moved laterally along the chart parallel with the side thereof, until its angle coincides with the line indicating the known weight of the roll, being at $a'$ in the 260 line shown in Figs. 1 and 3, after which the chart is neatly cut or torn along the edges of the square, thus dividing the chart along the lines $a$—$a'$ and $a'$—$a''$ into an L-shaped section above and to the right of these lines and a rectangular oblong section below and to the left of these lines, such rectangular section being shown by full lines in Fig. 3 of the drawings, and the L-shaped section being indicated by broken lines in the same figure.

The L-shaped section of the chart is then delivered to the cost department for the purpose of deducting from inventory the weight of the roll which has been taken from stock; and the remaining rectangular section of the chart is retained with the roll until all the paper therein is used, for the purpose of measuring and recording the number of pounds taken therefrom for each successive job or order.

It is evident that when the original chart is thus cut or severed along the longitudinal line $a$—$a'$ and the transverse line $a'$—$a''$, the right edge of the rectangular severed portion of the chart extends from its intersection with the zero cross line to its intersection with the cross line representing the known weight of the given roll, and the total length of this edge is equal to the net radius of the given roll from the core to the periphery thereof; and that said edge of the severed portion of the chart constitutes a scale which indicates the weight of the paper in the given roll at each radial point from the core to the original periphery thereof, when applied to the end of the roll in the manner shown in Fig. 3.

For making a permanent record of the amount of paper used for each particular job or order, the upper end of the rectangular section of the chart retained with the roll, which protrudes beyond the periphery of the roll when applied thereto at the completion of the job, is torn off along a transverse or horizontal line, as $e$ in Fig. 3, and it is obvious that the chart line terminating at the corner of the remaining portion of the rectangular section indicates the number of pounds of paper remaining in the roll, as for instance, 150 pounds as illustrated in Fig. 3, which deducted from 260 pounds shows that 110 pounds of paper have been removed from the roll for printing the first job or order therefrom.

The severed end portion of the rectangular section is filed in the cost recording envelop pertaining to the particular job, and the remainder of the rectangular section is retained with the roll, to be used again in like manner for measuring the amount of paper used in each succeeding job or order, until the entire roll is consumed; it being understood that as each successive section and portion of the chart is detached from another, the same is identified as pertaining to the original chart and to the particular roll of paper by the duplicate serial numbers appearing in the left margin of the chart.

Lines $b$—$b'$ and $b'$—$b''$ represent the rectangular section which is cut or torn from a chart used to measure the end of a roll having an original weight of 260 pounds and a net radius equal to the length of the line $b$—$b'$; and lines $c$—$c'$ and $c'$—$c''$ likewise represent the rectangular section which is cut or torn from a chart used to measure the end of a roll having an original weight of 210 pounds and a net radius equal to the length of the line $c$—$c'$.

Although the drawings illustrate a chart made or developed with cross lines indicating ten (10) pound increments of weight, it is obvious that a chart can be made in the same way with cross lines representing increments of weight of any number of pounds, and in fact, the original chart from which the drawings were made, contains lines representing five (5) pound increments of weight, the intervening five (5) pound lines being omitted from the patent drawings because of the reduced scale thereof.

It is likewise obvious that for different kinds of paper and printing, rolls of paper are necessarily used of greater weight than four hundred (400) pounds and of a greater net radial variation than represented in the chart illustrated and described herein, but in any case, a suitable chart can readily be made and developed in the manner illustrated and described herein. In some cases, the entire chart may be made with parallel lines, and in other cases with distorted or curved lines, but for the use described herein, it is preferred to combine a portion of the chart made with parallel lines with another portion made with distorted or curved lines, as a matter of practical convenience.

I claim:

1. A chart for measuring the weight of paper or the like in rolls, such chart having thereon a series of continuous lines spaced to represent the varying portions of radial lines corresponding to like increments of weight in rolls of differential weights, and the lines being designated to indicate the weight to which they correspond.

2. A chart for measuring the weight of paper or the like in rolls, such chart having thereon a series of continuous curved lines spaced to represent the varying portions of radial lines corresponding to like increments of weight in rolls of differential weights, and the lines being designated to indicate the weight to which they correspond.

3. A chart for measuring the weight of paper or the like in rolls, such chart having thereon a series of continuous lines straight in one portion and curved in another portion and spaced to represent the varying portions of radial lines corresponding to like increments of weight in rolls of different weights, and the lines being designated to indicate the weight to which they correspond.

4. A chart for measuring the weight of paper or the like in a roll having a case, such chart having thereon a series of continuous cross lines spaced longitudinally to represent the varying portions of radial lines corresponding to like increments of weight in rolls of differential weights and the cross lines being designated to indicate the weight to which it corresponds, and one longitudinal edge of the chart extending from its intersection with the zero cross line to its intersection with the cross line corresponding to the known weight of a given roll, and such longitudinal edge being equal in length to the net radius of such given roll from the core to the periphery thereof.

5. A chart for measuring the weight of paper or the like in rolls, such chart having thereon a series of continuous cross lines longitudinally spaced to represent the varying portions of radial lines corresponding to like increments of weight in rolls of different weights, and the lines being designated to indicate the weights to which they correspond, and there being a serial designation duplicated at intervals longitudinally of the chart.

CLYDE E. DEVERS.